United States Patent [19]
Anderson

[11] 4,185,937
[45] Jan. 29, 1980

[54] FASTENING DEVICE WITH POSITIVE LOCKING MEANS

[75] Inventor: Bernard J. Anderson, Danvers, Mass.

[73] Assignee: General Electric Company, Lynn, Mass.

[21] Appl. No.: 936,976

[22] Filed: Aug. 25, 1978

[51] Int. Cl.² ............................................. F16B 39/00
[52] U.S. Cl. ..................................... 403/316; 151/37; 151/48; 403/377
[58] Field of Search .................... 151/37, 40, 48, 49, 151/44, 2 R, 2 A; 403/316, 317, 320, 377

[56] References Cited

U.S. PATENT DOCUMENTS

| | | | |
|---|---|---|---|
| 801,714 | 10/1905 | Ferrin | 403/320 X |
| 2,926,026 | 2/1960 | Matteson | 151/44 UX |
| 3,016,077 | 1/1962 | Yocum | 151/70 |
| 3,631,688 | 1/1972 | Quick | 403/316 X |

FOREIGN PATENT DOCUMENTS 1050612  2/1959  Fed. Rep. of Germany ............. 151/44

*Primary Examiner*—Andrew V. Kundrat
*Attorney, Agent, or Firm*—Henry J. Policinski; Derek P. Lawrence

[57] ABSTRACT

A fastening device with positive locking means is provided comprising a generally cylindrical threaded portion and a headed portion proximate thereto. An elastically deformable annular ring portion is spaced apart from the threaded portion and includes locking means disposed thereon which are adapted to selectively prevent rotation of the fastening device in accordance with deformation of the ring.

12 Claims, 4 Drawing Figures

FASTENING DEVICE WITH POSITIVE LOCKING MEANS

The invention herein described was made in the course of or under a contract or subcontract thereunder, (or grant) with the Department of the Navy.

BACKGROUND OF THE INVENTION

This invention relates to a fastening device having positive locking means and, more particularly, to such a fastening device installed in a limited access environment such as that associated at the connection between a pair of hollow rotating shafts typically found in a gas turbine engine.

In certain areas of a gas turbine engine, it is extremely important that fastening means be positively secured. That is to say, bolts and the like, which are subject to engine vibrations and other cyclic forces, must be secured in their installed position lest they otherwise loosen during operation of the engine.

Positively secured fastening means have been the subject of prior activity. By way of example, U.S. Pat. Nos. 928,845; 1,333,742; 1,784,026; 3,016,077; and 3,561,516 all disclose various schemes for positively securing bolts in their installed position. It is observed that the devices described in these references contain a multiplicity of small hard-to-handle component parts. In a limited access environment, installation of these devices is tedious and difficult. In some instances, these component parts may be easily dropped during the installation or removal process and retrieval of the part is most difficult due to the poor visibility into the limited access location.

In other instances, the locking mechanism is located within the head or shank of the bolt and hence the mechanism must be comprised of many diminutive component parts which are difficult to manipulate in a limited accessibility area.

Additionally, these small component parts because of their size are fragile subject to easy breakage and lacking in rugged construction.

Therefore, it is an object of the present invention to provide a bolt having positive locking means for maintaining the bolt positively locked in an installed position.

It is another object of the present invention to provide a bolt having a positive locking means wherein the bolt and the locking means are of a rugged construction.

It is yet another object of the present invention to provide a bolt with positive locking means not having a multiplicity of separate component parts.

It is still another object of the present invention to provide a bolt with positive locking means which may be formed integrally with the bolt.

It is still yet another object of the present invention to provide a bolt with positive locking means disposed spaced apart or remote from the bolt itself.

Briefly stated, these and other objects which will become apparent from the following specification and appended drawings are accomplished by the present invention which provides for, in one form, a bolt having positive locking means comprising a generally cylindrical threaded portion and a headed portion proximate thereto. An elastically deformable annular ring portion is spaced apart from the headed portion and includes locking means disposed thereon which are adapted to selectively prevent rotation of the bolt in accordance with deformation of the ring. The annular ring is disposed in a first contour wherein the locking means prevents rotation of the bolt in an installed portion. The annular ring is deformable to a second contour wherein the bolt may be rotated to the installed position. A pair of connecting fingers connect the annular ring to the head of the bolt. The connecting fingers may be joined to the ring at the node points of the ring in the deformed mode. Additionally, the first contour may be elliptical.

DESCRIPTION OF THE DRAWINGS

While the specification concludes with claims distinctly claiming and particularly pointing out the invention, it is believed that the description will be more readily understood by reference to accompanying drawings in which:

DESCRIPTION OF THE PREFERRED EMBODIMENT

Figure 1:
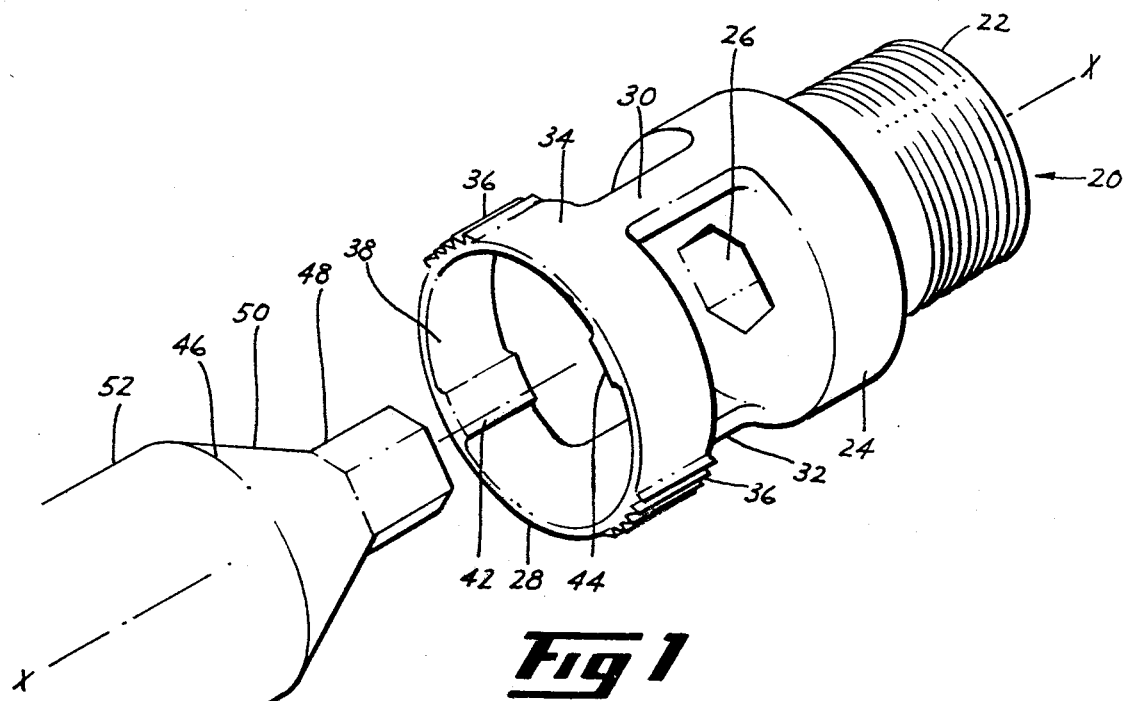
FIG. 1 is a perspective view of the bolt comprising the present invention along with a wrenching tool useable in installing and removing the bolt.

Referring now to FIG. 1, a perspective view of the bolt comprising the present invention is depicted generally at 20. Bolt or fastening device 20 is comprised of a generally cylindrical threaded portion 22 extending axially along axis x—x and integrally connected to enlarged headed portion 24. Wrenching means in the form of hexagonal recess 26 are centrally disposed within headed portion 24. Elastically deformable annular ring 28, spaced apart from enlarged head portion 24 and threaded portion 22 and co-axial therewith, is integrally secured thereto by a pair of axially extending connecting fingers 30 and 32.

As will hereinafter be described, annular ring 28 is deformable from a first position of generally elliptical contour to a second position having a more circular contour than the first contour. Fingers 30 and 32 are integrally connected to the annular ring 28 at or proximate the node points of the elliptical contour when ring 28 is deformed as hereinafter described. Hence, connected to these node points, the fingers 30 and 32 do not deflect radially during deformation of annular ring 28 and twist only slightly to accommodate deformation of ring 28. This feature of the present invention permits fingers 30 and 32 to be of relatively short axial length since the fingers 30, 32 do not appreciably deflect and consequently are not subject to significant bending stresses. Hence the present invention exhibits a compact configuration.

Annular ring 28 includes a first circumferentially extending radially outwardly facing surface 34 upon which locking means or elements in the form of ratchet-like serrations 36 are formed. As will hereinafter be explained, serrations 36 are adapted to selectively prevent rotation of bolt 20 and are movable radially inwardly in accordance with deformation of ring 28. Depending upon the particular application of the present invention, serrations 36 may be disposed at a single location along the circumferential extent or at a number of selected locations as depicted in FIG. 1. Annular ring 28 also includes a second circumferentially extending radially inwardly facing surface 38 upon which a pair of radially inwardly projecting separation tabs 42, 44 are disposed. As will hereinafter be shown, tabs 42 and 44 are engageable with a spreading or wrenching tool 46 to deform annular ring 28, which normally exhibits a first or elliptical contour, into a second contour having a major diameter less than the major diameter of the first contour. With ring 28 deformed to the second contour, bolt 20 may be rotated into an installed position. Generally, tool 46 is provided with a wrenching portion 48, having a configuration complimentary to wrenching means or recess 26, and a conical ramp portion 50 adapted to engage tabs 42 and 44. As the tabs transgress ramp portion 50 they are progressively spread apart from each other thereby deforming annular ring 28 to the second contour. Tool 46 is also provided with cylindrical portion 52 adapted to engage and maintain tabs 42 and 44 at a fixed distance apart from each other. The diameter of cylindrical portion 52 is selected to achieve a precise diametrical spread of tabs 42, 44 such that annular ring will not be deformed past its elastic limit. Conical ramp 50 and cylindrical portion 52 function to disengage the bolt locking means 36 while wrenching portion 48 cooperates with recess 26 to provide means for rotating bolt 20. It should be stated that separation of tabs 42, 44 establish the node points of annular ring 28. As previously stated connecting fingers 30 and 32 are connected to annular ring 28 at these node points.

Figures 2, 3:
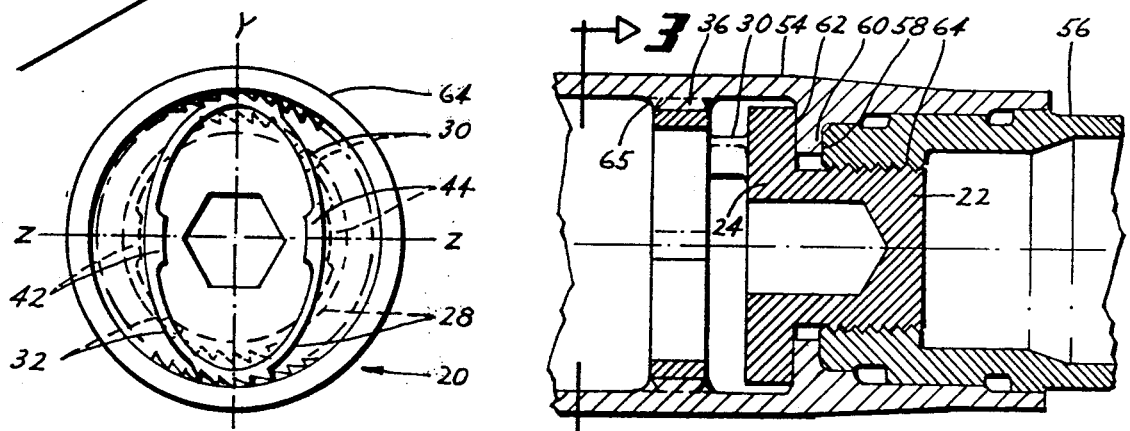
FIG. 2 is a partial cross-sectional view showing the bolt comprising the present invention depicted in an installed position against a pair of co-axial shafts.
FIG. 3 is a view taken along the lines 3—3 of FIG. 2.

Referring now to FIG. 2, a cross-sectional view of the present invention is depicted installed in a working environment wherein bolt 20 is effective to secure a pair of hollow, interfitting, generally cylindrical, co-axial, drive shafts 54 and 56 to each other. Shafts 54 and 56 are typical of those which would be found in a gas turbine engine environment such as comprise compressor and turbine drive shafts respectively. Shafts 54 and 56 are adapted abut each other at an interface 58 disposed on shoulder 60 of shaft 54. The other face 62 of shoulder 60 engages head portion 24 of bolt 20. Threads 64 on shaft 56 engage threaded portion 22 of bolt 20. In the fully installed position as shown in FIG. 2, bolt 20 secures the shafts 54, 56 in abutting relationship at interface 58 engagement as threaded portion 22 occupies a fully advanced position within shaft 56. In this position, annular ring 28 exhibits an elliptical contour and the serrations 36 on ring 28 are engaged by complementary locking elements or serrations 65, disposed on the interior of shaft 54. The locking relationship between serrations 65 and 36 prevent rotation of ring 28 and bolt 20 in the fully installed position.

Figure 4:
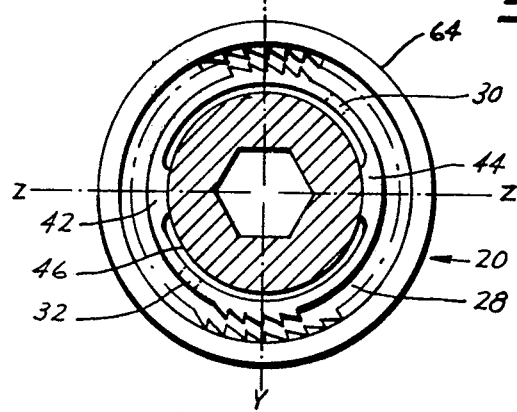
FIG. 4 is an end view of the bolt comprising the present invention with the wrenching tool inserted.

FIG. 3 is a view taken generally along the line 3—3 of FIG. 2. However, also shown greatly exaggerated, as dashed lines in FIG. 3, is the second contour which annular ring 28 undertakes when spreading tool 46 is fully inserted within bolt 20. FIG. 4 depicts the present invention with tool 46 fully inserted within ring 28 so as to deform ring 28 to the second contour. Referring now to FIGs. 3 and 4, insertion of tool 46 forces tabs 42 and 44 diametrically apart along the minor axis z—z of the elliptical first contour. Movement of tabs 42 and 44 apart deforms annular ring 28 to a second contour depicted as dashed lines in FIG. 3 wherein the major diameter of the second contour is less than the major diameter of the annular ring in the first contour. Deformation of ring 28 in this manner draws serrations 36 a sufficient distance radially inwardly along the major axis y—y to disengage serrations 36 on ring 28 from serrations 65 on shaft 54. With annular ring 28 deformed to the second contour, wrenching portion 48 of tool 46 resides in recess 26 of bolt 20 such that the ring 28 and bolt 20 may then be freely rotated during installation and removal. It should be noted that with the ring 28 disposed in the second contour the minor diameter of the ring must be less than the major diameter of ring 28 in the first contour. This insures that ring bolt 28 may be rotated without any part of ring 28 striking shaft 54. With ring 28 deformed to the second contour bolt 20 may be rotatively tighted to the desired degree. The tool 46 may then be removed releasing the annular ring to the first contour and permitting serrations 36 to move radially outwardly and engage serrations 65. Bolt 20 is thereby locked against further rotation while it is in the installed position. When removal of bolt 20 is desired, tool 46 may be inserted within bolt 20 again deforming annular ring 28 to disengage serrations 36 from serrations 65. Bolt 20 may then be rotated and removed by tool 46 through cooperation of wrenching portion 28 with recess 26.

As viewed in FIGS. 3 and 4, in its undeformed state, annular ring 28 exhibits a generally elliptical configuration. Tabs 42 and 44 are disposed at or approximately at an angle 90° away from serrations 36 generally along the minor diameter of the elliptical contour. Location of tabs 42 and 44 in this manner provides maximum radial movement of serrations 36 along the major axis y—y of the elliptical contour in response to minimal movement of tabs 42 and 44 along the minor axis z—z of the elliptical contour. Furthermore, fingers 30 and 32 are disposed at or approximately at an angle of 45° away from tabs 42 and 44. Disposition of fingers 30 and 32 in this manner insures that annular ring 28 is connected to fingers 30 and 32 at the node points associated with the elliptical contour of annular ring 28. Consequently, deformation of fingers 30 and 32 is insignificant since the node points do not move during deformation of annular ring 28.

It is apparent from the foregoing description that a bolt with positive locking means has been provided which fulfills the objects hereinbefore stated. The present invention provides a bolt with positive locking means formed integrally therewith and hence the present invention does not suffer the disadvantages associated with prior art devices having a multiplicity of small separate component parts. Additionally, in the present invention the positive locking means are spaced-axially or remotely from the threaded and headed portions of the bolt and hence the positive locking means may be comprised of a construction more rugged than prior art devices which have small fragile locking means disposed within the confines of the bolt head or bolt shank. Yet another feature of the present invention is that the bolt is automatically unlocked with insertion of the wrenching tool. Hence, with use of the present invention, torque to remove the bolt can never be applied with the locking mechanism engaged. Thus, inadvertent damage to the locking mechanism is avoided. These are but a few advantages which the present invention has over prior art devices.

While the preferred embodiment of the present invention has been described fully in order to explain its principles, it is understood that various modifications or alterations may be made therein without departing from the scope of the invention as set forth in the appended claims. By way of example, in the preferred embodiment described herein the starting configuration is elliptical. It may well be that other starting configurations such as a circular configuration may be equally suitable in other embodiments without departing from the scope of the invention. Additionally the concepts and design structure described herein as applicable to positively locking of a fastening device in the form of a bolt are equally applicable to the positively locking other fastening elements such as a nut.

I claim:

1. A fastening device having positive locking means comprising:
   a generally cylindrical threaded portion;
   a headed portion proximate said threaded portion;
   an elastically deformable annular ring portion spaced-apart from said threaded portion; and
   locking means disposed on said deformable annular ring portion and adapted to selectively prevent rotation of said fastening device, said locking means movable in accordance with deformation of said ring.

2. The invention as set forth in claim 1 wherein said annular ring is disposed in a first contour wherein said locking means prevents rotation of said fastening device in an installed position said annular ring deformable to a second contour wherein said fastening device may be rotated to said installed position.

3. The invention of claim 2 wherein said annular ring is spaced axially from said headed portion and is fixedly secured therewith by a plurality of circumferentially spaced axially extending connecting fingers, said first contour being elliptical.

4. The invention as set forth in claim 3 wherein said fingers are connected to said annular ring proximate the mode points associated with said elliptical contour.

5. The invention as set forth in claim 3 further comprising:
   a first circumferentially extending and radially outwardly facing surface disposed on said annular ring, said locking means comprising a plurality of locking serrations disposed on said first surface;
   a second circumferentially extending radially inwardly facing surface on said annular ring; and
   a pair of opposed tabs disposed on said second surface, said tabs project radially inwardly from said second surface.

6. A bolt having positive locking means comprising:
   a cylindrical axially extending threaded portion;
   a headed portion integrally formed adjacent one end of said threaded portion;
   an elastically deformable annular ring axially spaced from said headed portion, said ring having a first circumferentially extending radially outwardly facing surface and a second circumferentially extending radially inwardly facing surface disposed therein;
   at least one circumferentially spaced and axially extending connecting finger securing said annular ring to said headed portion;
   a plurality of a ratchet-like teeth disposed on said first surface;
   at least one separating tab disposed on said second surface, said tab projecting radially inwardly from said second surface; and
   wrenching means disposed on said headed portion for engagement with a tool for rotating said bolt.

7. The invention as set forth in claim 6 wherein said elastically deformable annular ring has an elliptical contour, said fingers being connected to said ring proximate the node points of said elliptical contour.

8. The invention comprising:
   first and second generally cylindrical shafts abutting one another at an interface;
   a fastening device having a cylindrical threaded portion and a headed portion, said threaded portion adapted to engage one of said shafts and said headed portion adapted to engage the other of said shafts to maintain said shafts in abutting relationship at said interface; and
   an elastically deformable annular ring disposed generally co-axial with said cylindrical threaded portion and connected to said headed portion said annular ring including a radially facing surface having locking elements disposed thereon, said annular ring having a first contour wherein said locking elements engage one of said shafts in a locking relationship to prevent rotation of said annular ring and said fastening device, said annular ring deformable to a second contour, said locking elements movable radially in response to said deformation of said ring so as to disengage said elements from said one of said shafts and permit rotation of said annular ring and said fastening device during installation and removal of said fastening device.

9. The invention as set forth in claim 8 wherein said first contour is elliptical.

10. The invention as set forth in claim 8 further comprising:
    at least one finger-like member connecting said annular ring to said headed portion.

11. The invention set forth in claim 10 wherein first contour is elliptical.

12. The invention set forth in claim 11 wherein said finger like members are connected to said annular ring proximate the node points associated with said elliptical contour.

* * * * *